Patented Dec. 14, 1926.

1,610,310

UNITED STATES PATENT OFFICE.

CHRISTINE ORTLI, OF NEW YORK, N. Y., ASSIGNOR, BY MESNE ASSIGNMENTS, TO NATIONAL CARBON COMPANY, INC., OF NEW YORK, N. Y., A CORPORATION OF NEW YORK.

GELATINOUS ELECTROLYTE.

No Drawing. Application filed September 6, 1923. Serial No. 661,313.

This invention relates to the preparation of gelatinous electrolyte for galvanic cells and batteries. A principal object of the invention is to improve the manufacture of alkali-containing starchy pastes adapted to serve as the electrolyte of Lalande or copper oxid cells.

According to present practice in making gelatinous electrolyte for such cells, starch or the like is gelatinized in a solution of caustic alkali. The temperature of the solution must be kept below 100° C. during the process to prevent adverse effects upon the product.

I have discovered that improved results may be obtained and the process materially simplified by hydrolyzing the starch to a suitable degree before the addition of the alkali. In the preferred form of the invention, a suspension of starch in water is heated until substantially the maximum degree of hydrolysis of the starch is obtained. Since alkali is absent, no care need be taken as to the temperature, and the starch-containing water may be vigorously boiled to expedite the hydrolysis. An important economy in operation is thus effected.

The amount of starch used should in general be insufficient to produce a gelatinous mass when its water solution is allowed to cool. When alkali is added to the solution a clear, firm jelly is produced. Good results may be obtained by using a composition formed from 100 parts by weight of water, 2½ parts of starch, and 21 parts of solid caustic soda. These proportions may of course be considerably varied to suit particular conditions.

The alkali should be added in solid form or in concentrated solution and uniformly distributed throughout the starch-containing water.

The solution or suspension of starch may be placed in the cells and gelatinized therein by addition of alkali, or the alkali may be added and the mixture poured into the cells before setting takes place.

Gelatinous electrolyte prepared as described has certain decided advantages over that made according to prior methods. For example, the new electrolyte shows less tendency to liquefy on protracted current drain. The gelatinous mass is also firmer than when made by initial treatment of starch with alkali, the same quantities of materials being used in each case. These results may be due to the fact that a greater portion of the starch is hydrolyzed according to the present method.

Cells with the improved gelatinous electrolyte have an ampere hour capacity per unit volume equal or superior to that of comparable cells of the prior type.

Although the invention has been described with particular reference to use with caustic alkali electrolyte, it will be understood that the preliminary hydrolysis of starch by water alone is applicable in other connections, as for example in the preparation of the zinc chlorid-ammonium chlorid pasty electrolyte of dry cells of the Leclanché type.

Various departures from the specific form of the invention described may be made within the scope of the appended claims.

I claim:—

1. Process of making gelatinous electrolyte from starch, caustic alkali, and water, which comprises heating the starch with the bulk of the water, and then adding the alkali in concentrated form.

2. Process of making gelatinous electrolyte from starch, caustic alkali, and water, which comprises heating a suspension of starch in water for such time and at such temperature as to effect substantially complete hydrolysis of the starch, and then adding the alkali in a solid state, whereby a gelatinous mass is produced.

3. A gelatinous electrolyte for primary batteries containing starch, caustic alkali and water, said compound being substantially identical with a compound produced by hydrolyzing a suspension of 2½ parts of starch in 100 parts of water and then adding approximately 21 parts of solid caustic alkali to the hydrolyzed product.

In testimony whereof, I affix my signature.

CHRISTINE ORTLI.